US009984314B2

(12) United States Patent  
Philipose et al.

(10) Patent No.: US 9,984,314 B2  
(45) Date of Patent: May 29, 2018

(54) DYNAMIC CLASSIFIER SELECTION BASED ON CLASS SKEW

(71) Applicant: Microsoft Technology Licensing, LLC, Redmond, WA (US)

(72) Inventors: Matthai Philipose, Seattle, WA (US); Haichen Shen, Seattle, WA (US); Alastair Wolman, Seattle, WA (US); Sharad Agarwal, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 15/148,900

(22) Filed: May 6, 2016

(65) Prior Publication Data

US 2017/0323184 A1 Nov. 9, 2017

(51) Int. Cl.
    *G06N 3/04* (2006.01)
    *G06K 9/62* (2006.01)
    *G06K 9/00* (2006.01)
    *G06N 3/08* (2006.01)

(52) U.S. Cl.
    CPC ....... *G06K 9/6285* (2013.01); *G06K 9/00718* (2013.01); *G06K 9/628* (2013.01); *G06K 9/6227* (2013.01); *G06K 9/6256* (2013.01); *G06N 3/08* (2013.01)

(58) Field of Classification Search
    USPC ........................................................ 382/158
    See application file for complete search history.

(56) References Cited

U.S. PATENT DOCUMENTS

| 5,835,567 | A  | 11/1998 | Woods |
| 5,903,884 | A  | 5/1999  | Lyon et al. |
| 6,219,837 | B1 | 4/2001  | Yeo et al. |
| 6,741,655 | B1 | 5/2004  | Chang et al. |
| 7,149,359 | B1 | 12/2006 | Omoigui |
| 7,835,578 | B2 | 11/2010 | Cheng et al. |
| 8,189,685 | B1 | 5/2012  | Choudhry et al. |
| 9,177,550 | B2 | 11/2015 | Yu et al. |

(Continued)

FOREIGN PATENT DOCUMENTS

EP      2639731     9/2013

OTHER PUBLICATIONS

"International Search Report and Written Opinion", Application No. PCT/US2017/016320, dated Jun. 9, 2017, 13 pages.

(Continued)

*Primary Examiner* — Jerome Grant, II (57) ABSTRACT

A classification system classifies different aspects of content of an input image stream, such as faces, landmarks, events, and so forth. The classification system includes a general classifier and at least one specialized classifier template. The general classifier is trained to classify a large number of different aspects of content, and a specialized classifier can be trained based on a specialized classifier template during operation of the classification system to classify a particular subset of the multiple different aspects of content. The classification system determines when to use the general classifier and when to use a specialized classifier based on class skew, which refers to the temporal locality of a subset of aspects of content in the image stream.

20 Claims, 5 Drawing Sheets

(56) References Cited

U.S. PATENT DOCUMENTS

| | | | |
|---|---|---|---|
| 2004/0111465 A1* | 6/2004 | Chuang | H04L 29/06 709/203 |
| 2006/0071081 A1* | 4/2006 | Wang | G06K 7/10 235/462.45 |
| 2007/0041444 A1* | 2/2007 | Gutierrez Novelo | H04N 19/597 375/240.15 |
| 2007/0294716 A1 | 12/2007 | Jeong et al. | |
| 2009/0123083 A1* | 5/2009 | Kawase | G06T 3/4007 382/254 |
| 2009/0292685 A1 | 11/2009 | Liu et al. | |
| 2010/0082614 A1 | 4/2010 | Yang et al. | |
| 2010/0166319 A1* | 7/2010 | Zhang | G06K 9/6211 382/201 |
| 2011/0026591 A1 | 2/2011 | Bauza et al. | |
| 2011/0211814 A1 | 9/2011 | Sarukkai | |
| 2013/0047189 A1* | 2/2013 | Raveendran | H04N 21/23 725/81 |
| 2013/0243081 A1* | 9/2013 | Chen | H04N 19/597 375/240.02 |
| 2014/0142929 A1 | 5/2014 | Seide et al. | |
| 2015/0019214 A1 | 1/2015 | Wang et al. | |
| 2015/0125049 A1 | 5/2015 | Taigman et al. | |
| 2015/0161782 A1* | 6/2015 | Mohr | G06T 7/136 382/128 |
| 2015/0242707 A1 | 8/2015 | Wilf et al. | |
| 2015/0296228 A1 | 10/2015 | Chen et al. | |
| 2015/0310012 A1 | 10/2015 | Kim et al. | |
| 2015/0324688 A1 | 11/2015 | Wierzynski et al. | |
| 2016/0353130 A1* | 12/2016 | Hwang | H04N 19/597 |
| 2016/0360279 A1 | 12/2016 | Batmanglidj et al. | |
| 2017/0116429 A1* | 4/2017 | Tessman | G06F 21/6209 |
| 2017/0142287 A1* | 5/2017 | Hasegawa | H04N 1/393 |
| 2017/0235828 A1 | 8/2017 | Philipose et al. | |

OTHER PUBLICATIONS

Holmstad, "Real-time Annotation of Video Streams Using Staged Processing", Jun. 2011, 73 pages.

Weiming, "A Survey on Visual Content-Based Video Indexing and Retrieval", IEEE Transactions on Systems, Man, and Cybernetics: Part C: Applications and Reviews, Nov. 1, 2011, pp. 797-819.

Sun, et al., "Deep Learning Face Representation from Predicting 10,000 Classes", In Proceedings of IEEE Conference on Computer Vision and Pattern Recognition, Jun. 23, 2014, pp. 1891-1898.

Viola, et al., "Robust Real-Time Face Detection", In International Journal of Computer Vision, vol. 57, Issue 2, May 2004, pp. 137-154.

Ciresan, et al., "Multi-column Deep Neural Networks for Image Classification", In Technical Report No. IDSIA-04-12, Feb. 2012, pp. 1-19.

Viola, et al., "Rapid Object Detection using a Boosted Cascade of Simple Features", In Proceedings of the IEEE Computer Society Conference on Computer Vision and Pattern Recognition, vol. 1, Dec. 8, 2001, pp. 511-518.

Takacs, et al., "Outdoors Augmented Reality on Mobile Phone using Loxel-Based Visual Feature Organization", In Proceedings of the 1st ACM international conference on Multimedia information retrieval, Oct. 30, 2008, pp. 427-434.

Gudi, Amogh, "Recognizing Semantic Features in Faces using Deep Learning", In Master's Thesis of University of Amsterdam, Sep. 2014, pp. 1-58.

Agarwal, et al., "Vision: The Case for Cellular Small Cells for Cloudlets", In Proceedings of Fifth International Workshop on Mobile Cloud Computing & Services, Jun. 16, 2014, pp. 1-5.

Bansal, et al., "A Primal-Dual Randomized Algorithm for Weighted Paging", In Journal of ACM, vol. 59, No. 4, Aug. 2012, 24 pages.

Buchbinder, et al., "Online Primal-Dual Algorithms for Covering and Packing", In Journal of Mathematics of Operations Research, vol. 34, Issue 2, Apr. 17, 2009, pp. 1-19.

Chekuri, et al., "A Polynomial Time Approximation Scheme for the Multiple Knapsack Problem", In SIAM Journal on Computing, vol. 35, Issue 3, Feb. 2006, pp. 713-728.

Chen, et al., "DianNao: A Small-Footprint High-Throughput Accelerator for Ubiquitous Machine-Learning", In Proceedings of 19th International Conference on Architectural Support for Programming Languages and Operating Systems, Mar. 1, 2014, pp. 269-283.

Chen, et al., "Glimpse: Continuous, Real-Time Object Recognition on Mobile Devices", In Proceedings of 13th ACM Conference on Embedded Networked Sensor Systems, Nov. 1, 2015, pp. 155-168.

Chen, et al., "Compressing Neural Networks with the Hashing Trick", In Proceedings of 32nd International Conference on Machine Learning, Jul. 6, 2015, 10 pages.

Chilimbi, et al., "Project Adam: Building an Efficient and Scalable Deep Learning Training System", In Proceedings of 11th USENIX Symposium on Operating Systems Design and Implementation, Oct. 6, 2014, pp. 571-582.

Cuervo, et al., "MAUI: Making Smartphones Last Longer with Code Offload", In Proceedings of 8th International Conference on Mobile Systems, Applications, and Services, Jun. 15, 2010, pp. 49-62.

Dean, et al., "Large Scale Distributed Deep Networks", In Proceedings of 26th Annual Conference on Neural Information Processing Systems, Dec. 3, 2012, pp. 1-9.

Deng, et al., "ImageNet: A Large-Scale Hierarchical Image Database", In Proceedings of IEEE Conference on Computer Vision and Pattern Recognition, Jun. 20, 2009, pp. 248-255.

Fathi, et al., "Learning to Recognize Objects in Egocentric Activities", In Proceedings of IEEE Conference on Computer Vision and Pattern Recognition, Jun. 20, 2011, pp. 3281-3288.

Ha, et al., "Towards Wearable Cognitive Assistance", In Proceedings of 12th Annual International Conference on Mobile Systems, Applications, and Services, Jun. 16, 2014, pp. 68-81.

Han, et al., "GlimpseData: Towards Continuous Vision-Based Personal Analytics", In Proceedings of Workshop on Physical Analytics, Jun. 16, 2014, pp. 31-36.

Hanai, et al., "A Versatile Recognition Processor Employing Haar-Like Feature and Cascaded Classifier", In Proceedings of IEEE International Solid-State Circuits Conference—Digest of Technical Papers, Feb. 10, 2009, pp. 148-150.

Huang, et al., "A Close Examination of Performance and Power Characteristics of 4G LTE Networks", In Proceedings of the 10th international conference on Mobile systems, applications, and services, Jun. 25, 2012, pp. 225-238.

Jaderberg, et al., "Speeding up Convolutional Neural Networks with Low Rank Expansions", In Proceedings of British Machine Vision Conference, Sep. 1, 2014, pp. 1-12.

Jia, et al., "Gaffe: Convolutional Architecture for Fast Feature Embedding", In Proceedings of the 22nd ACM international conference on Multimedia, Nov. 3, 2014, pp. 675-678.

Karpathy, et al., "Deep Fragment Embeddings for Bidirectional Image-Sentence Mapping", In Proceedings of Annual Conference on Neural Information Processing Systems, Dec. 8, 2014, pp. 1-9.

Kanade, et al., "First-Person Vision", In Proceedings of the IEEE, vol. 100, Issue 8, Aug. 2012, pp. 2442-2453.

Lane, et al., "DeepEar: Robust Smartphone Audio Sensing in Unconstrained Acoustic Environments using Deep Learning", In Proceedings of the ACM International Joint Conference on Pervasive and Ubiquitous Computing, Sep. 7, 2015, pp. 283-294.

Lei, et al., "Accurate and Compact Large Vocabulary Speech Recognition on Mobile Devices", In Proceedings of the 14th Annual Conference of the International Speech Communication Association, Aug. 25, 2013, pp. 662-665.

Likamwa, et al., "Energy Characterization and Optimization of Image Sensing Toward Continuous Mobile Vision", In Proceeding of the 11th annual international conference on Mobile systems, applications, and services, Jun. 25, 2013, pp. 69-81.

"Meerkat Streams Live", Retrieved on: Feb. 17, 2016 Available at: http://meerkatstreams.com/.

"Nvidia Jetson tk1 development board", Retrieved on: Feb. 17, 2016 Availale at: http://www.nvidia.com/object/jetson-tk1-embedded-dev-kit.html.

(56) References Cited

OTHER PUBLICATIONS

"Nvidia Shield", Retrieved on: Feb. 17, 2016 Available at: http://shield.nvidia.com.
Ra, et al., "Odessa: Enabling Interactive Perception Applications on Mobile Devices", In Proceedings of the 9th international conference on Mobile systems, applications, and services, Jun. 28, 2011, pp. 43-56.
Krizhevsky, et al., "Imagenet Classification with Deep Convolutional Neural Networks", In Proceedings of the 26th Annual Conference on Neural Information Processing Systems, Dec. 3, 2012, pp. 1-9.
"PWRcheck", Retrieved on: Feb. 17, 2016 Available at: http://www.westmountainradio.com/pdf/PWRcheckManual.pdf.
Ren, et al., "Histograms of sparse codes for object detection", In Proceedings of the IEEE Conference on Computer Vision and Pattern Recognition, Jun. 23, 2013, 8 pages.
Romero, et al., "Fitnets: Hints for thin deep nets", In Journal of Computing Research Repository, Dec. 2014, pp. 1-12.
Simonyan, et al., "Very deep convolutional networks for large-scale image recognition", In Journal of Computing Research Repository, Sep. 2014, pp. 1-14.
Sun, et al., "Modeling wifi active power/energy consumption in smartphones", In Proceedings of IEEE 34th International Conference on Distributed Computing Systems, Jun. 30, 2014, 11 pages.
Szegedy, et al., "Going deeper with convolutions", In Journal of Computing Research Repository, Sep. 2014, pp. 1-12.
Chang, "VideoQ: An Automated Content Based Video Search System Using Visual Cues", In Proceedings of the fifth ACM international conference on Multimedia, Nov. 9, 1997, pp. 313-324.
Hauptmann, "Video Retrieval using Speech and Image Information", In Proceedings of Storage Retrieval for Multimedia Databases, Jan. 20, 2003, 12 pages.
Lin, "Visual Semantic Search: Retrieving Videos via Complex Textual Queries", In Proceedings of IEEE Conference on Computer Vision and Pattern Recognition, Jun. 23, 2014, 8 pages.
Moxley, "Automatic Video Annotation Through Search and Mining", In Proceedings of IEEE International Conference on Multimedia and Expo, Jun. 23, 2008, 4 pages.
Siddharth, "Seeing What You're Told: Sentence-Guided Activity Recognition in Video", In Proceeding of IEEE Conference on Computer Vision and Pattern Recognition, Jun. 23, 2014, 8 pages.
Sivic, "Efficient Visual Search for Objects in Videos", In Proceedings of the IEEE, vol. 96, Issue 4, Apr. 2008, pp. 548-566.
Sivic, "Video Google: A Text Retrieval Approach to Object Matching in Videos", In Proceedings of Ninth IEEE International Conference on Computer Vision, vol. 2, Oct. 14, 2003, pp. 1-8.
Sivic, "Video Google: Efficient Visual Search of Videos", In Journal of Toward Category-Level Object Recognition, vol. 4170, 2006, pp. 127-144.
Sumathi, "Analysis of an Automatic Text Content Extraction Approach in Noisy Video Images", In International Journal of Computer Applications, vol. 69, Issue 4, May 2013, 8 pages.
Wei, "Concept-Driven Multi-Modality Fusion for Video Search", n Proceedings of IEEE Transactions on Circuits and Systems for Video Technology, vol. 21, Issue 1, Jan. 13, 2011, pp. 1-12.
"International Search Report and Written Opinion", Application No. PCT/US2017/029739, dated Jul. 13, 2017, 11 pages.
"Non-Final Office Action", U.S. Appl. No. 15/043,219, dated Jul. 21, 2017, 12 pages.
Szegedy, et al., "Going deeper with convolutions", In Proceedings of IEEE Conference on Computer Vision and Pattern Recognition, Jun. 7, 2015, pp. 1-9.
Taigman, et al., "Deep-Face: Closing the Gap to Human-Level Performance in Face Verification", In Proceedings of IEEE Conference on Computer Vision and Pattern Recognition, Jun. 23, 2014, pp. 1701-1708.
"Periscope ", Retrieved on: Feb. 17, 2016 Available at: http://www.periscope.tv/.
Xia, et al., "Sun database: Large-scale scene recognition from abbey to zoo", In Proceedings of IEEE Conference on Computer Vision and Pattern Recognition, Jun. 13, 2010, pp. 3485-3492.
Xue, et al., "Singular value decomposition based low-footprint speaker adaptation and personalization for deep neural network", In Proceedings of the IEEE International Conference on Acoustics, Speech and Signal Processing, May 4, 2014, 5 Pages.
Yu, et al., "Exploiting sparseness in deep neural networks for large vocabulary speech recognition", In Proceedings of the IEEE International Conference on Acoustics, Speech and Signal Processing, Mar. 25, 2012, pp. 4409-4412.
Zhou, et al., "Learning deep features for scene recognition using places database", In Proceedings of the Advances in Neural Information Processing Systems, Dec. 8, 2014, pp. 1-9.

\* cited by examiner

DYNAMIC CLASSIFIER SELECTION BASED ON CLASS SKEW

BACKGROUND

As computing technology has advanced, computing devices have become increasingly present in our lives. One way in which computing devices are used is to analyze images to identify particular objects in those images, such as people's faces. Although this identification of objects is beneficial, it is not without its problems. One such problem is that this analysis of images can be computationally expensive and slow, which can lead to user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an image stream is received. A determination is made as to when a specialized classifier can be used to classify a subset of multiple aspects of content of the image stream, the specialized classifier exploiting class skew of the subset of the multiple aspects, the determination including identifying when the subset of the multiple aspects dominates the image stream. The specialized classifier is accessed to classify the subset of the multiple aspects, and the specialized classifier is used rather than a general classifier (e.g., which is trained to classify the multiple aspects of content of the image stream rather than just a subset of those multiple aspects) to classify the subset of the multiple aspects in subsequent images of the image stream.

In accordance with one or more aspects, a classification system includes a general classifier, a template store, and a classifier selection system. The general classifier is configured to classify multiple aspects of content of an image stream. The template store includes multiple different specialized classifier templates, each of the specialized classifier templates being configured to classify a subset of the multiple aspects. The classifier selection system is configured to re-train one of the multiple different specialized classifier templates to generate a specialized classifier for a particular subset of the multiple aspects, and to determine when to switch between using the general classifier to classify the multiple aspects of content of the image stream and using the specialized classifier to classify the multiple aspects of content of the image stream.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Dynamic classifier selection based on class skew is discussed herein. A classification system classifies different aspects of content of an input image stream. These different aspects of content refer to different characteristics of and/or objects included in the content, such as faces, landmarks, vehicles, sporting events, and so on. The classification system includes a general classifier and at least one specialized classifier template. The general classifier is trained to classify a large number of different aspects of content, such as to classify (e.g., recognize) the faces of all the different people a user knows. The specialized classifier template can be used to train a specialized classifier during operation of the classification system to classify a particular subset of the multiple different aspects of content, such as to recognize the faces of the five people present during an hour-long meeting. This particular subset is typically much smaller than the large number of aspects that the general classifier can classify. For example, the input image stream can be video captured by the user (e.g., using glasses or other wearable computing device) as he or she goes through the day, and a specialized classifier template can be trained to classify (e.g., recognize) in that video the faces of five different people that the user is in a meeting with for an hour of that day.

The classification system determines when to use the general classifier and when to use a specialized classifier. The classification system makes this determination based on class skew, which refers to the temporal locality of a subset of aspects of content in the image stream. The class skew is, for example, over some window of time a frequency with which the same aspects are identified in the content (e.g., classified as those aspects by the general classifier or a specialized classifier). For example, the class skew can be that the same x objects are identified in the content y percent of the time over the previous z seconds (e.g., the same 5 objects are identified in the content 90 percent of the time over the previous 30 seconds). The classification system makes the determination of when to use the general classifier and when to use a specialized classifier dynamically, which refers to the classification system making the determination while running based on the particular content in the input image stream.

The classification system expects that the class skew will change over time. Thus, the classification system determines, when running, when to switch between the general classifier and a specialized classifier. Furthermore, the classification system determines, when running, which particular subset of aspects the specialized classifier is to be trained to classify. For example, a user may progress through six different meetings with different groups of people throughout the day, and video captured during each of those meetings is analyzed. If the aspects of the content are faces of people in the video, then for each meeting the classification system detects the faces of the people in the meeting and trains a specialized classifier for use during that meeting, resulting in a different specialized classifier for each meeting. The classification system trains the specialized classifier while running (e.g., during the meeting or during playback of the video of the meeting), generating the specialized classifier to classify (identify) the particular people in any given meeting.

When a specialized classifier is used to classify aspects of the input image stream, the specialized classifier and the general classifier are typically (but need not be) chained together. The specialized classifier analyzes an image of the input stream (e.g., a frame of video), and classifies one or more aspects of the image as one of the particular subset of aspects for which the specialized classifier is trained if possible. If the specialized classifier is not able to classify an aspect of the image, then the general classifier analyzes the image and classifies one or more aspects of the image as one of the aspects for which the general classifier is trained.

The general classifier is an expensive classifier relative to a specialized classifier, the specialized classifier classifying aspects of the input image stream faster (e.g., with lower average latency to complete operations) and more efficiently (e.g., using lower total resources, such as memory and/or processing power, to complete operations) than the general classifier. For example, for a particular subset of aspects that the general classifier can classify, the specialized classifier may be able to classify that subset of aspects of the input image stream 10 to 100 times faster than the general classifier. The classification system selects the specialized classifier rather than the general classifier when appropriate, thus allowing classification of aspects of the input image stream faster and more efficiently when possible (relative to using the general classifier). The techniques discussed herein thus increase the performance of the system by reducing the amount of time consumed when classifying aspects of an image stream. Furthermore, the techniques discussed herein reduce the computational resources expended when classifying aspects of an image stream, allowing such classification to be performed on less powerful computing devices, reducing the financial cost of the computing devices as well as the power consumption of the computing devices.

Figure 1:
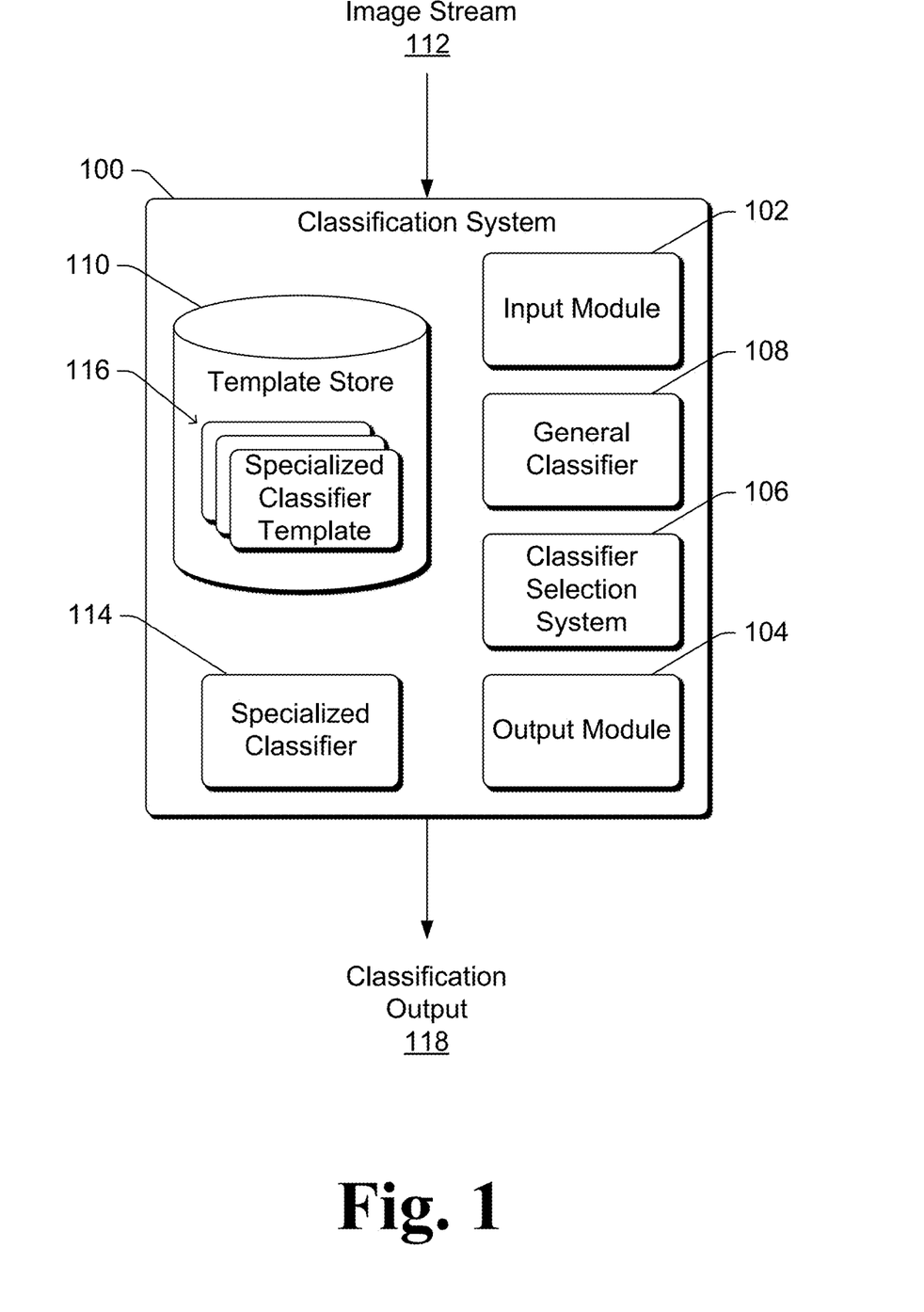
FIG. 1 illustrates an example classification system implementing the dynamic classifier selection based on class skew in accordance with one or more embodiments.

FIG. 1 illustrates an example classification system 100 implementing the dynamic classifier selection based on class skew in accordance with one or more embodiments. The classification system 100 can be implemented by any of a variety of different types of computing devices. For example, the classification system 100 can be implemented on a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality glasses or headset, virtual reality glasses or headsets), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the classification system 100 can be implemented on computing devices ranging from a full resource device with substantial memory and processor resources (e.g., personal computers, game consoles) to a low-resource device with limited memory and/or processing resources (e.g., traditional set-top boxes, hand-held game consoles). The classification system 100 can be implemented on a single computing device or alternatively distributed across multiple computing devices of the same or different types.

The classification system 100 includes an input module 102, an output module 104, a classifier selection system 106, a general classifier 108, and a template store 110. The input module 102 obtains an image stream 112 that includes multiple different images. The image stream 112 can be video (e.g., each image being a frame of the video), a sequence of still images, and so forth. The input module 102 can obtain the image stream 112 in various different manners, such as from a video streaming source (e.g., via a network such as the Internet, a local area network (LAN)), from a storage device that is local to or remote from the computing device implementing the classification system 100 (e.g., previously recorded video), and so forth.

The classifier selection system 106 selects either the general classifier 108 or a specialized classifier 114 to use to classify aspects of the content of the image stream 112. The specialized classifier 114 is generated by training a specialized classifier template 116 from the template store 110. Although a single specialized classifier 114 is illustrated in FIG. 1, it should be noted that the classification system 100 can include multiple specialized classifiers (e.g., trained from the same or different specialized classifier templates 116). The classifier selection system 106 determines which of the general classifier 108 and the specialized classifier 114 to select based on the class skew, as discussed in more detail below. The general classifier 108 is trained on a large set of training data (larger than is used to train the specialized classifier as discussed in more detail below) that includes all (or at least a threshold amount of) the aspects that the general classifier 108 is expected to classify. For example, if the general classifier is classifying faces, then the general classifier 108 is trained on a set of input data that includes all of the faces that the general classifier 108 is expected to recognize.

One or more aspects of the image stream 112 are classified (by the general classifier 108 or by a specialized classifier). Classifying an aspect of the image stream 112 is also referred to as identifying or recognizing an aspect of the image stream 112. The recognized or identified aspect of the image stream 112 is also referred to as the class of the aspect (or of the image). Each image of the image stream 112 can be classified as having a single aspect, or alternatively multiple aspects of an image of the image stream 112 can be classified. These different aspects of content refer to different characteristics of and/or objects included in the content. For example, these aspects of content can be people's faces, animals, buildings, landmarks, vehicles, sporting events, recreational events, and so on.

The output module 104 provides the classifications of the aspects of the image stream 112 as the classification output 118. The classification output 118 can be provided to other components of the computing device implementing the classification system 100, can be provided to other computing devices, can be saved to a data store (e.g., volatile or nonvolatile memory device) for later use, and so forth. The output module 104 can provide the classifications of the aspects of the image stream 112 in different manners. In one or more embodiments, the output module 104 provides, for each image of the image stream 112, an indication of zero or more aspects of the content of the image. Additionally or alternatively, the output module 104 can provide, each time an aspect of the image stream 112 changes, an indication of the change. The output module 104 can optionally provide various additional information as part of the classification output 118. For example, a location in the image where the aspect (e.g., a particular object) is identified and classified by the general classifier 108 or a specialized classifier can be output as part of the classification output 118.

Figure 2:
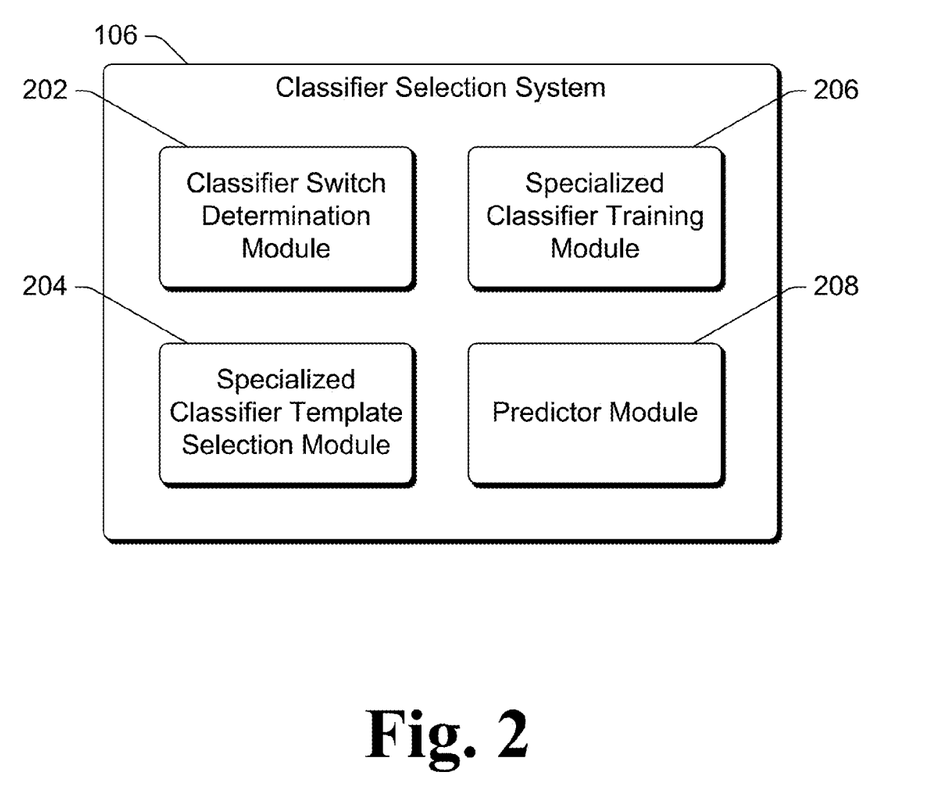
FIG. 2 illustrates an example classifier selection system in accordance with one or more embodiments.

FIG. 2 illustrates an example classifier selection system 106 in accordance with one or more embodiments. The classifier selection system 106 is, for example, the classifier selection system 106 of FIG. 1. The classifier selection system 106 includes a classifier switch determination module 202, a specialized classifier template selection module 204, a specialized classifier training module 206, and a predictor module 208.

Generally, the classifier switch determination module 202 is configured to determine when to switch between using the general classifier to classify the multiple aspects of content of the image stream and a specialized classifier to classify the multiple aspects of content of the image stream. The specialized classifier template selection module 204 is configured to select a specialized classifier template to use for the specialized classifier. The specialized classifier training module 206 is configured to train a specialized classifier for a particular subset of the multiple aspects of the image stream, such as by re-training one of the multiple different specialized classifier templates. The predictor module 208 is configured to predict whether a switch to a specialized classifier is worth it (e.g., whether the class skew is expected to last for at least as long as the time it is expected to take to train the specialized classifier).

The classifier switch determination module 202 is configured to determine when to switch between using the general classifier to classify the multiple aspects of content of the image stream and using a specialized classifier to classify the multiple aspects of content of the image stream. In one or more embodiments, when the classifier selection system 106 begins running the classifier switch determination module 202 selects the general classifier to classify the aspects of the content of the image stream. The classifier switch determination module 202 monitors the classifications generated by the general classifier and determines when there is sufficient class skew to justify switching to using a specialized classifier.

When there is sufficient class skew to justify switching to using a specialized classifier can be determined in various different manners. Various different rules or criteria can be applied, such as determining to switch to using a specialized classifier in response to the same x aspects being identified in the content y percent of the time over a time window of z seconds (e.g., the same 4 objects are identified in the content 85 percent of the time over the previous 60 seconds). The values of x, y, and z can be determined in various manners, such as pre-configured into the classifier selection system 106, obtained from an administrator or user of the classifier selection system 106, learned over time by the classifier selection system 106, and so forth. If the rules or criteria are satisfied, then those aspects (e.g., the same x aspects) dominate the input image stream.

In one or more embodiments, the classifier switch determination module 202 maintains a cumulative distribution function (CDF) of the classes resulting from classifying the input image stream for the general classifier. A separate CDF can similarly be maintained for each specialized classifier, or alternatively a single CDF can be maintained that is common to the general classifier as well as each specialized classifier. The classifier switch determination module 202 determines if a small fraction of possible classes "dominate" the CDF. If so, the classifier switch determination module 202 determines to switch to a specialized classifier that is trained on a subset of the original data dominated by these classes. This subset of the original data refers to a subset of the data used to train the general classifier.

The classifier switch determination module 202 determines that a CDF C is n,p-dominated if n of its most frequent classes account for at least fraction p of its weight. For instance, if 10 of 4000 possible people account for 90% of faces recognized, the corresponding CDF would be (10,0.9)-dominated. The classifier switch determination module 202 checks for n,p-dominance in the CDF. In one or more embodiments, the classifier switch determination module 202 takes the approach of picking n∈{7, 14, 21} and p∈{0.6, 0.7, 0.8, 0.9, 0.95}. Thus, for instance, if the top 7 people constitute over 60% of faces recognized, the classifier switch determination module 202 determines to switch to using a specialized classifier that is specialized to (trained to) those seven faces. If the values of n and p are met, then those n classes dominate the CDF (and also dominate the input image stream).

The specialized classifier template selection module 204 is configured to select a specialized classifier template to use for the specialized classifier. One of multiple different specialized classifier templates is selected, such as one of the specialized classifier templates 116 of FIG. 1. In some situations only a single specialized classifier template may exist, in which case that single specialized classifier template is selected. Each specialized classifier template is, for example, a specialized classifier that has not yet been trained for the particular subset of aspects that dominate the CDF.

In one or more embodiments, the general classifier as well as each specialized classifier is made up of multiple different layers. Shallow classifiers (classifiers with fewer layers) can classify aspects of content in the image stream more quickly and using less computational resources than deeper classifiers (classifiers with more layers) for a smaller number of aspects, but shallow classifiers are not as accurate classifying as many aspects as can be classified by deeper classifiers. Thus, the specialized classifier templates from which the specialized classifier template selection module 204 selects are shallower templates than the general classifier.

Different ones of the specialized classifier templates have different depths, and various different rules or criteria can be used by the specialized classifier template selection module 204 to select one of the specialized classifier templates. These rules or criteria are based at least in part on the class skew. For example, the number of aspects that are determined by the classifier switch determination module 202 to dominate the CDF can be used to determine which specialized classifier template to select. E.g., if there are less than a first threshold number of aspects (e.g., 5) that dominate the CDF then a shallowest specialized classifier template is selected, if there are at least the first threshold number of aspects but less than a second threshold number of aspects (e.g., 11) that dominate the CDF then a next shallowest specialized classifier template is selected, and if there are at least the second threshold number of aspects that dominate the CDF then a deepest specialized classifier template is selected.

In one or more embodiments, these rules or criteria are determined empirically prior to deployment of the classification system 100 (e.g., prior to running the classifier selection system 106 on an end user's computing device). Different specialized classifier templates, having different depths, will have different performance characteristics. These performance characteristics can include accuracy of classification, speed of classification, and so forth. A designer or developer of the classifier selection system 106 can analyze the performance of the various different specialized classifier templates for different numbers of aspects to be classified, and determine which specialized classifier template provides the performance desired by the designer or developer for each of different numbers of aspects to be classified.

The rules or criteria used to select one of the specialized classifiers can additionally or alternatively take into account various other factors regarding the computing device or environment in which the specialized classifier runs. These factors can include, for example, whether a specialized classifier template has already been loaded into memory of the computing device implementing the classifier selection system 106 (e.g., the specialized classifier template selection module 204 favoring (e.g., selecting) a specialized classifier template that has already been loaded into random access memory (RAM) over a specialized classifier template that has not already been loaded into RAM due to the time taken to load a specialized classifier template into RAM).

These factors can also include, for example, a frequency of use of the different specialized classifier templates. The specialized classifier template selection module 204 can favor (e.g., select) a specialized classifier template that is used more frequently over a specialized classifier template that is used less frequently, anticipating that the specialized classifier template used more frequently is more likely to be used again in the near future, and thus can be maintained in RAM rather than being unloaded from or paged out of RAM.

These factors can also include, for example, the resource usage of the different specialized classifier templates. This can optionally include a current power state of the computing device running the specialized classifier (e.g., whether the computing device is operating in a high power mode or a power saving mode), an amount of power remaining in a battery of the device, and so forth. The specialized classifier template selection module 204 can favor (e.g., select) a specialized classifier template that uses fewer resources (e.g., computing power) over a specialized classifier template that uses more resources (e.g., computing power) in order to reduce energy usage in the computing device running the specialized classifier.

The specialized classifier training module 206 is configured to train a specialized classifier for a particular subset of the multiple aspects. This particular subset of the multiple aspects is made up of the aspects that are determined by the classifier switch determination module 202 to dominate the CDF. In one or more embodiments, the specialized classifier training module 206 is configured to re-train one of the multiple different specialized classifier templates to generate the specialized classifier for the particular subset of the multiple aspects.

In one or more embodiments, each specialized classifier template is trained to classify a particular number of aspects prior to making the specialized classifier template available for selection (e.g., prior to placing the specialized classifier template in the template store 110 of FIG. 1). This can be a subset of the number of aspects that the general classifier is trained to classify, or can be all of the aspects that the general classifier is trained to classify. The training of a specialized classifier herein can also be referred to as re-training of a specialized classifier template.

A specialized classifier is trained based on the selected specialized classifier template. In one or more embodiments, the specialized classifier template includes multiple layers as discussed above, with lower layers representing facts or data regarding particular types of aspects in general, and a top layer discriminating among different aspects of the same type. These types of aspects can be different characteristics of the image content, such as faces, buildings, landmarks, and so forth. For example, the classification system may be used to identify different faces in image content. The lower layers of the specialized classifier represent facts or data about faces in general (to distinguish faces from other objects or characteristics of the content), and the top layer discriminates among different faces.

In one or more embodiments, when training a specialized classifier, the top layer of the classifier is re-trained based on the subset of aspects that are determined by the classifier switch determination module 202 to dominate the CDF. For example, if seven faces dominate the CDF, then the specialized classifier is trained by re-training the top layer of the selected specialized classifier template to distinguish among those seven faces. The lower layers of the specialized classifier template, which represent facts or data about faces in general in this example, are run to provide the input to the top layer, but the lower layers need not be retrained because the same types of aspects (e.g., faces) are being classified. Re-training only the top layer of the specialized classifier template allows the specialized classifier template to be re-trained faster than if all layers of the specialized classifier template were trained.

In one or more embodiments, the specialized classifier templates are run prior to use of the specialized classifier templates by the specialized classifier template selection module 206. The specialized classifier templates can be run using various different input images (e.g., the same, or a subset, of the images used to train the general classifier). The results of (the data output) by those lower layers can be saved. The specialized classifier training module 206 then accesses that saved data and uses it, along with images including the aspects that dominate the CDF and caused the classifier switch determination module 202 to determine to switch to a specialized classifier, to train the top layer of the specialized classifier. Thus, rather than re-running the entire specialized classifier template, the specialized classifier can be generated by running only the top layer of the specialized classifier template and using the previously saved data from previous runnings of the specialized classifier template for the lower layers.

Alternatively, rather than re-training only the top layer of the selected specialized classifier template, one or more of the lower layers can also be re-trained.

Each specialized classifier trained by the specialized classifier training module 206 thus exploits class skew of the multiple aspects for which the specialized classifier is trained. For example, a specialized classifier trained to classify a subset of five particular aspects exploits the fact that the specialized classifier need distinguish among only five different aspects as opposed to many more (e.g., the thousands of aspects that the general classifier may distinguish among).

A specialized classifier is trained to distinguish among and classify a particular subset of aspects (e.g., seven faces). However, situations can arise in which the specialized classifier is not able to identify a particular aspect (e.g., a face is included in an image that is not one of the seven faces for which the specialized classifier is trained). In such situations, the specialized classifier outputs an indication (e.g., a classification of "other") indicating that it is unable to classify the aspect. In response to this indication, the general classifier analyzes and classifies the aspect of the image.

In one or more embodiments, the general classifier as well as each specialized classifier (and specialized classifier template) is implemented as a deep neural network. A deep neural network is an artificial neural network that includes an input layer and an output layer. The input layer receives an image of the image stream as an input, the output layer provides the classification of one or more aspects of the image, and multiple hidden layers between the input layer and the output layer perform various analysis on the image to generate the classification (identify the aspects). The classifiers can alternatively be implemented as any of a variety of other types of classifiers. For example, the classifiers can be implemented using any of a variety of different clustering algorithms, any of a variety of regression algorithms, any of a variety of sequence labeling algorithms, as a decision tree, and so forth. Different classifiers can be implemented in the same manner or alternatively different manners. For example, one or more specialized classifiers can be implemented using other types of classifiers than the general classifier.

Figure 3:
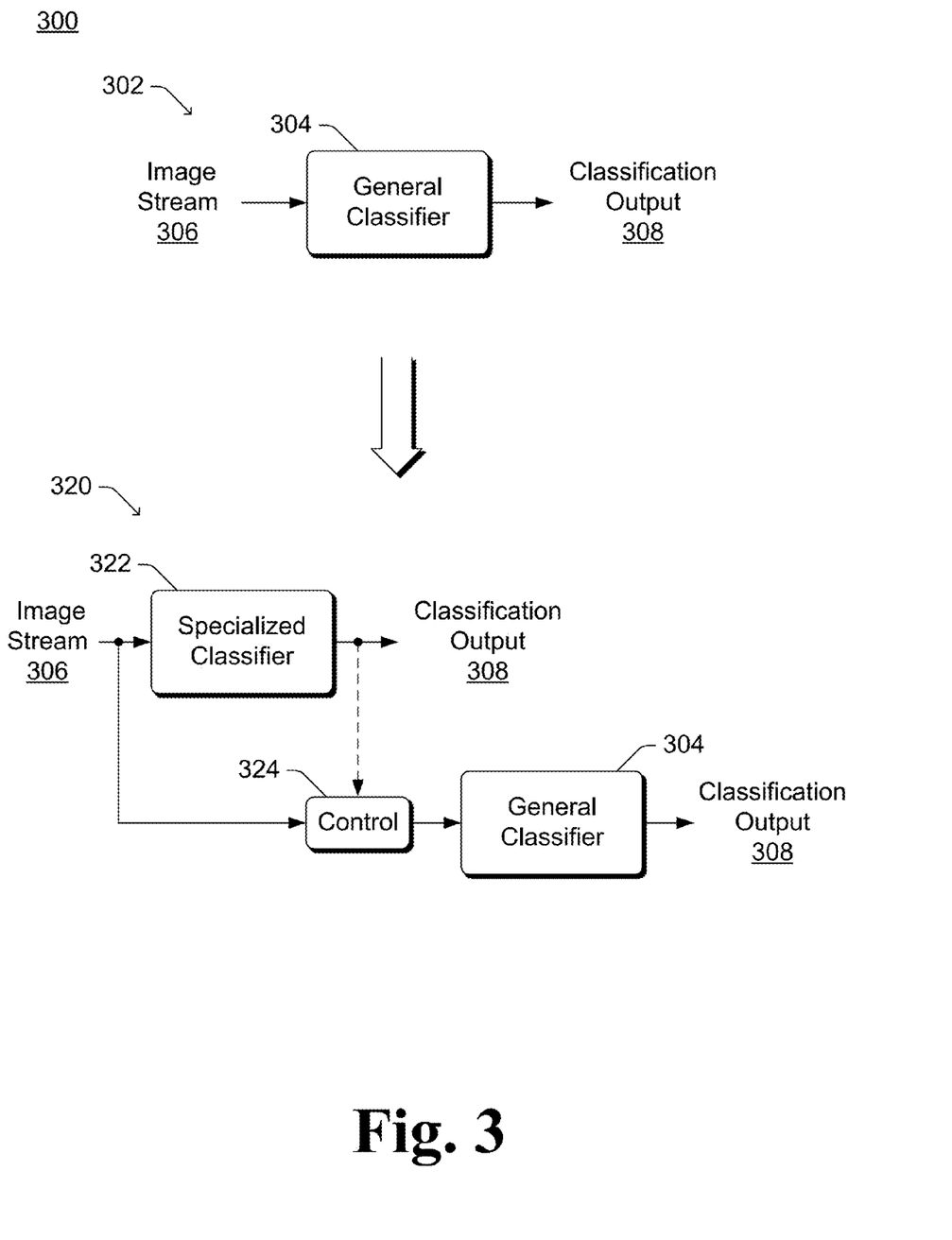
FIG. 3 illustrates an example of the use of and switching between a general classifier and a specialized classifier in accordance with one or more embodiments.

FIG. 3 illustrates an example 300 of the use of and switching between a general classifier and a specialized classifier in accordance with one or more embodiments. In the example 300, as shown at 302, a general classifier 304 is used to classify aspects of an input image stream 306. The general classifier 304 generates a classification output 308 that identifies the classification of aspects of the input image stream 306. The general classifier 304 can be the general classifier 108 of FIG. 1, the image stream 306 can be the image stream 112 of FIG. 1, and the classification output 308 can be the classification output 118 of FIG. 1.

In response to a determination to switch to a specialized classifier, a specialized classifier 322 is trained to distinguish among a particular subset of aspects that the general classifier 304 distinguishes among. The specialized classifier 322 can be a specialized classifier trained based on a specialized classifier template 116 of FIG. 1 (e.g., the specialized classifier 322 can be the specialized classifier 114 of FIG. 1). As shown at 320, the specialized classifier 322 generates the classification output 308 that identifies the classification of one of the particular subset of aspects for which the specialized classifier 322 is trained. If the specialized classifier 322 is unable to identify the classification of an aspect of the image, the specialized classifier 322 outputs an indication of such (e.g., a classification of "other"). A control module 324 allows, in response to the indication that the specialized classifier is unable to identify the classification of an aspect of the image, the image to be provided to the general classifier 304. The general classifier 304 then generates a classification output 308 that identifies the classification of aspects of the input image stream 306.

Thus, as can be seen in the example 300, when using a specialized classifier 322 the specialized classifier 322 and the general classifier 304 are chained together. The specialized classifier 322 operates to classify the aspects of the input image stream 306 quickly, but if the specialized classifier 322 is unable to classify an aspect of the input image stream 306 then the general classifier 304 is used to classify that aspect. This can continue for any duration of time, with the specialized classifier 322 classifying the aspects it is able to classify, and the general classifier 304 being used to classify the aspects that the specialized classifier 322 is unable to classify.

Alternatively, the specialized classifier 322 and the general classifier 304 may not be chained together. In such situations, the classification output 118 is the output of the specialized classifier 322, and this output can be an indication that the specialized classifier 322 is unable to identify the classification of an aspect of the image.

Returning to FIG. 2, the classifier switch determination module 202 also determines when to switch away from use of the specialized classifier. Typically the classifier switch determination module 202 determines to switch from the specialized classifier to the general classifier, but can alternatively switch to another specialized classifier. Any of a variety of different rules or criteria can be used to determine when to switch away from the specialized classifier to the general classifier (or a different specialized classifier).

In one or more embodiments, the classifier switch determination module 202 determines to switch away from the specialized classifier and to the general classifier in response to the conditions that caused the classifier switch determination module 202 to switch to the specialized classifier no longer exist. For example, the classifier switch determination module 202 maintains a CDF of the classes resulting from classifying the input image stream by the specialized classifier. If the CDF for the specialized classifier indicates that the subset of aspects that dominated the CDF for the general classifier no longer dominate the CDF for the specialized classifier, then the classifier switch determination module switches to using the general classifier.

The predictor module 208 is configured to predict whether a switch to a specialized classifier is worth it—for example, whether the class skew is expected to last for a sufficient amount of time (e.g., longer than the time it is expected to take to train the specialized classifier). If the class skew is predicted to last a duration of time less than it takes to access (e.g., train) the specialized classifier, then the class skew will likely be gone prior to use of the specialized classifier and the specialized classifier can no longer exploit the class skew. In such situations, the classifier switch determination module 202 determines not to switch to the specialized classifier.

The predictor module 208 can be implemented using any of a variety of different rules or criteria for determining whether the class skew is expected to last for at least a threshold amount of time. This prediction can be done by analyzing the previous class skews from the image stream 112 and their duration (e.g., how long particular class skews or a particular level of dominance of particular numbers of aspects have lasted).

This prediction can also be done by analyzing various other information regarding the user and/or the computing device implementing the classification system. For example, if the user makes his or her calendar accessible to the predictor module 208, then the predictor module 208 can analyze the user's calendar to predict a duration of a class skew. E.g., if the user is currently in a meeting when dominance of a particular number of aspects is detected, and the meeting is scheduled to run another 20 minutes according to the user's calendar, then the predictor module 208 can determine that the class skew is expected to last for approximately 20 minutes (or, if it takes 15 seconds to train the specialized classifier, then that the class skew is expected to last for at least 15 seconds).

In one or more embodiments, the classifier selection system 106 is designed to keep the overhead of training a specialized classifier to less than a threshold amount of time (e.g., 5 seconds). Thus, rather than systems that may take one or more hours to train a specialized classifier, the techniques discussed herein allow the classifier selection system 106 to make use of the specialized classifiers in many different scenarios that last a short amount of time (e.g., a few minutes).

Although discussed as the classifier selection system 106 beginning running with the general classifier, alternatively when the classifier selection system 106 begins running the classifier switch determination module 202 can select a specialized classifier to classify the aspects of the content of the image stream. This specialized classifier can have been previously trained or otherwise generated. The classifier selection system 106 can then determine when to switch to the general classifier (or another specialized classifier) as discussed above.

Additionally, although the specialized classifier training module 206 is discussed herein as training specialized classifiers, in one or more embodiments a cache or store of specialized classifiers can optionally be maintained by the classifier selection system 106. Each specialized classifier trained for a particular subset of aspects can be maintained by the classifier selection system 106 for some amount of time (e.g., a few hours, a few days, or indefinitely). If the classifier switch determination module 202 detects that the same particular subset of aspects is dominating the CDF, then the classifier switch determination module 202 can switch to using that previously trained and cached/stored specialized classifier rather than having the specialized classifier trained by the specialized classifier training module 206 based on a specialized classifier template. Additionally or alternatively, the cache or store of specialized classifiers includes one or more specialized classifiers that are otherwise pre-trained (e.g., by the classifier selection system 106 or some other system) and maintained in the cache or store. The classifier switch determination module 202 can similarly use one of these otherwise pre-trained specialized classifiers rather than having the specialized classifier trained by the specialized classifier training module 206 based on a specialized classifier template.

Figure 4:
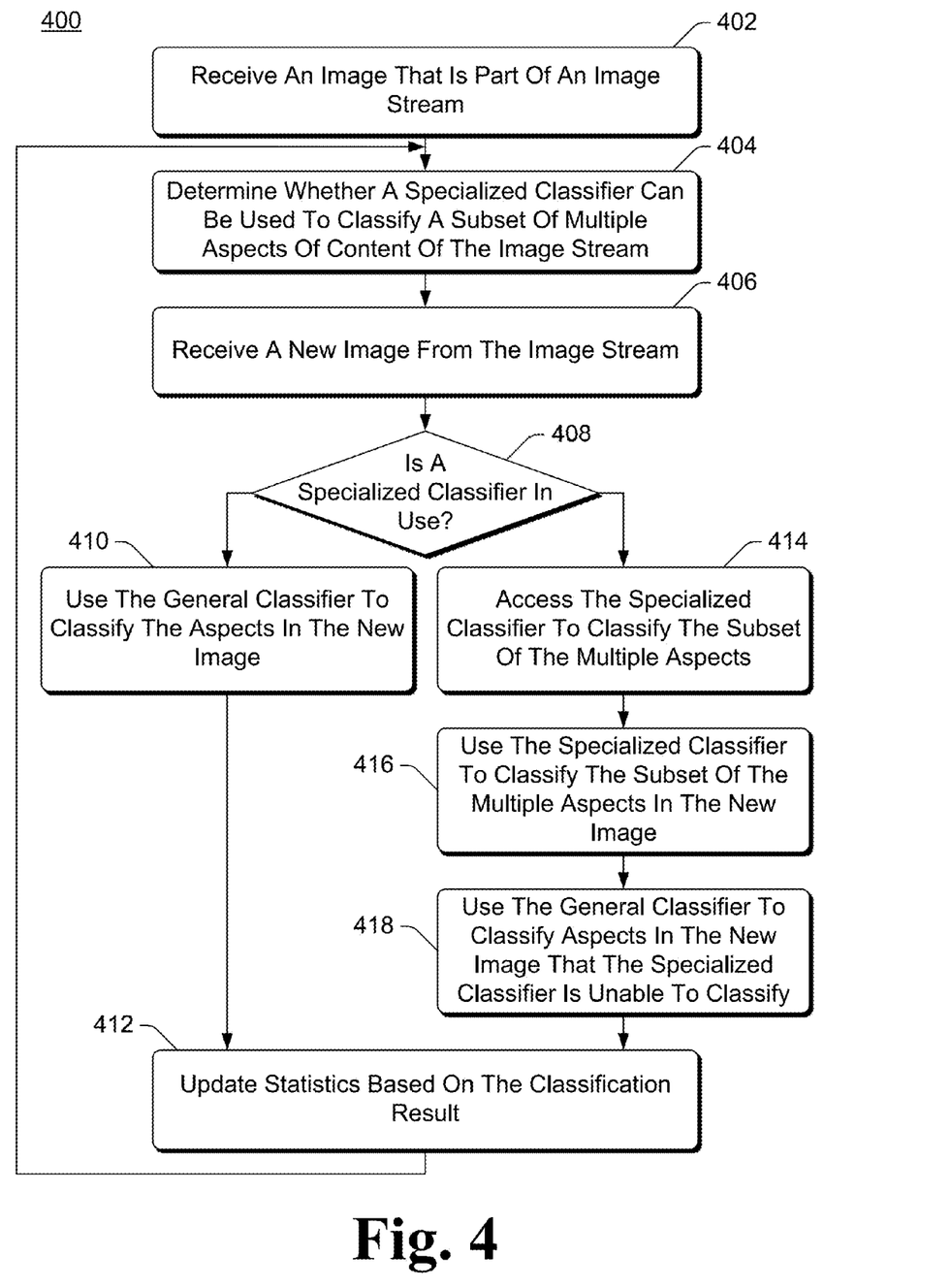
FIG. 4 is a flowchart illustrating an example process for implementing the dynamic classifier selection based on class skew in accordance with one or more embodiments.

FIG. 4 is a flowchart illustrating an example process 400 for implementing the dynamic classifier selection based on class skew in accordance with one or more embodiments. Process 400 is carried out by a classifier selection system, such as the classifier selection system 106 of FIG. 1 or FIG. 2. Process 400 can be implemented in software, firmware, hardware, or combinations thereof. Process 400 is shown as a set of acts and is not limited to the order shown for performing the operations of the various acts. Process 400 is an example process for implementing the dynamic classifier selection based on class skew; additional discussions of implementing the dynamic classifier selection based on class skew are included herein with reference to different figures.

In process 400, one or more images of an image stream is received (act 402). The image stream can be obtained from various local and/or remote sources as discussed above. It should be noted that the process 400 can operate on a frame-by-frame (e.g., image-by-image) basis as frames (e.g., images) are received, or with groups of frames (e.g., images). The process 400 need not wait to receive the whole image stream prior to classifying aspects of images in the image stream.

A determination is made as to whether a specialized classifier can be used to classify a subset of multiple aspects of content of the received image stream (act 404). This determination is made based on various different rules or criteria as discussed above. For example, if a particular subset of aspects dominates the CDF, and the class skew is predicted to last for at least a threshold amount of time, then the determination can be made to switch to using a specialized classifier.

A new image from the image stream is received (act 406), and process 400 proceeds based on whether a specialized classifier is in use (act 408). A specialized classifier is in use in situations in which it is determined that a specialized classifier can be used in act 404.

If the specialized classifier is not in use, then a general classifier is used to classify aspects in the new image (act 410).

Statistics based on the classification result (from the general classifier) are updated (act 412). Any of various different statistics used by the classifier switch determination module 202 of FIG. 2 to determine when to switch between using the general classifier to classify the multiple aspects of content of the image stream and using a specialized classifier to classify the multiple aspects of content of the image stream can be updated in act 412. These statistics can include, for example, which classes the aspects were classified in.

Process 400 then returns to act 404 to determine whether a specialized classifier can be used to classify a subset of multiple aspects of content of the received image stream. Whether a specialized classifier can be used can change, and typically does change, over time based on the updated statistics in act 412.

Returning to act 408, if the specialized classifier is in use, then the specialized classifier is accessed to classify a particular subset of the multiple aspects (act 414). The particular subset of the multiple aspects is, for example, the aspects that dominate the input image stream. In one or more embodiments, the specialized classifier is accessed by being trained. This training is, for example, re-training of a specialized classifier template as discussed above. Additionally or alternatively, the specialized classifier is accessed in other manners, such as by being retrieved or otherwise obtained from a store or cache, by being already in memory (e.g., RAM) such as due to use of the specialized classifier to classify the subset of the multiple aspects in a previous image of the image stream, and so forth.

The specialized classifier is used to classify the particular subset of the multiple aspects in the new image (act 416).

Additionally, the general classifier is used to classify aspects in the new image that the specialized classifier is unable to classify (act 418). As discussed above, the specialized classifier and the general classifier are chained together, so if an aspect of an image cannot be classified by the specialized classifier (e.g., due to the specialized classifier not being trained to classify that aspect), then the general classifier classifies that aspect of the image.

Statistics based on the classification result (from the specialized classifier or the general classifier) are updated (act 412). Process 400 then returns to act 404 to determine whether a specialized classifier can be used to classify a subset of multiple aspects of content of the received image stream.

Process 400 can be repeated for an image stream, causing the system to switch between the general classifier and one or more trained specialized classifiers over time as the image stream is received.

The techniques discussed herein support various different usage scenarios. For example, the image stream may be captured throughout the day for a user, providing video of the user's day. The user may tend to see the same 10 people 90% of the time he or she is at work, with various others seen infrequently while at work. A specialized classifier can thus be trained and used for the user while he or she is at work, reducing (for approximately 90% of the time the user is at work) the amount of time taken and the computing resources expended in classifying people he or she encounters at work. Similarly, the objects the user has in his or her living room are a small fraction of all those used in his or her life. A specialized classifier can thus be trained and used for the user while he or she is in his or her living room, reducing the amount of time taken and the computing resources expended in classifying objects while the user is in his or her living room. As another example, the places the user visits while shopping at the mall are a small fraction of all the places the user may visit in his or her daily life. A specialized classifier can thus be trained and used for the user while he or she is in the mall, reducing the amount of time taken and the computing resources expended in classifying places while the user is in the mall.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
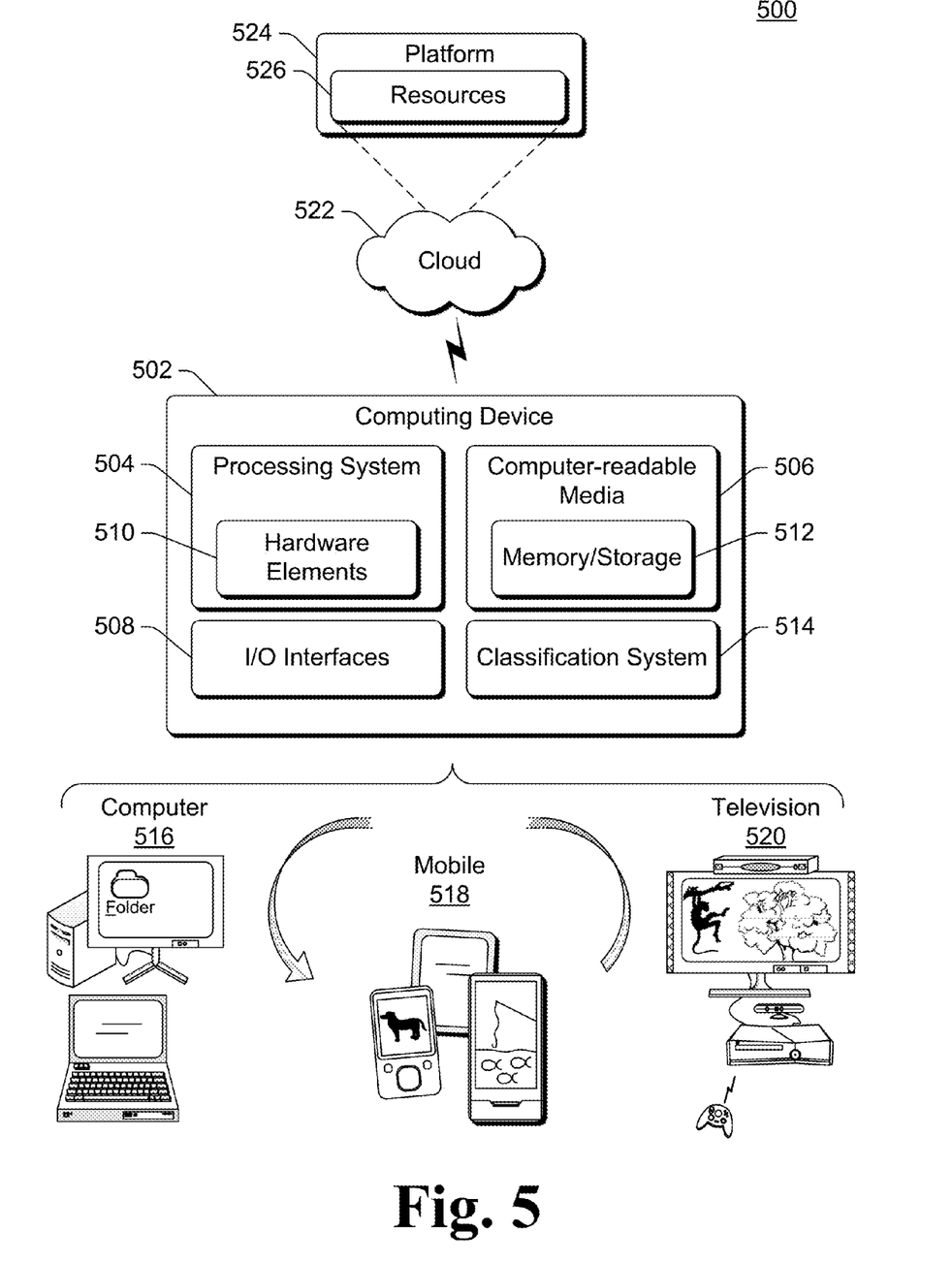
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a classification system 514. The classification system 514 classifies different aspects of an input image stream as discussed above. The classification system 514 can be, for example, the classification system 100 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: receiving an image stream; determining when a specialized classifier can be used to classify a subset of multiple aspects of content of the image stream, the specialized classifier exploiting class skew of the subset of the multiple aspects, the determining including identifying when the subset of the multiple aspects dominates the image stream; accessing the specialized classifier to classify the subset of the multiple aspects; and using the specialized classifier rather than a general classifier to classify the subset of the multiple aspects in subsequent images of the image stream.

Alternatively or in addition to any of the above described methods, any one or combination of: the method further comprising using, for a particular subsequent image of the image stream, the general classifier to classify one or more aspects of content in the particular subsequent image in response to the specialized classifier being unable to classify the one or more aspects of content in the particular subsequent image; the accessing the specialized classifier comprising training the specialized classifier; the training comprising obtaining a specialized classifier template from a store of multiple specialized classifier templates, the obtained specialized classifier template including multiple layers, re-training a top layer of the obtained specialized classifier template using images including the subset of the multiple aspects, and using ones of the multiple layers below the top layer as they exist in the obtained specialized classifier template; the ones of the multiple layers below the top layer having been trained for use in the specialized classifier template prior to receipt of the image stream; the determining further comprising accessing a store of multiple specialized classifier templates, selecting, based on the subset of the multiple aspects, one of the multiple specialized classifier templates, and using the selected one of the multiple specialized classifier templates as the specialized classifier to classify the subset of the multiple aspects; the selecting comprising determining the class skew of the multiple aspects, determining a number of aspects in the subset of the multiple aspects, and selecting one of the multiple specialized classifier templates based at least in part on the class skew of the multiple aspects and the number of aspects in the subset of the multiple aspects, which of the multiple specialized classifier templates to select for a particular class skew and a particular number of aspects in the subset of the multiple aspects having been pre-determined prior to receipt of the image stream; the determining further comprising predicting how long the class skew of the multiple aspects will last, determining that the specialized classifier can be used to classify the subset of the multiple aspects in response to the class skew being predicted to last at least as long as an amount of time that accessing the specialized classifier to classify the subset of the multiple aspects is expected to take, and determining that the specialized classifier is not to be used to classify the subset of the multiple aspects in response to the class skew being predicted to last less than the amount of time that accessing the specialized classifier to classify the subset of the multiple aspects is expected to take; the general classifier comprising a first deep neural network, and the specialized classifier comprising a second deep neural network that is shallower than the first deep neural network; the method further comprising determining when usage of the specialized classifier is to cease, and changing to using the general classifier, rather than the specialized classifier, to classify the subset of the multiple aspects in images of the image stream subsequent to the determination that usage of the specialized classifier is to cease.

A classification system comprising: a general classifier configured to classify multiple aspects of content of an image stream; a template store including multiple different specialized classifier templates, each of the multiple different specialized classifier templates being configured to classify a subset of the multiple aspects; and a classifier selection system configured to re-train one of the multiple different specialized classifier templates to generate a specialized classifier for a particular subset of the multiple aspects, and to determine when to switch between using the general classifier to classify the multiple aspects of content of the image stream and using the specialized classifier to classify the multiple aspects of content of the image stream.

Alternatively or in addition to any of the above described computing devices, any one or combination of: the classifier selection system being further configured to obtain a specialized classifier template from the template store, the obtained specialized classifier template including multiple layers, re-train a top layer of the obtained specialized classifier template using images including the particular subset of the multiple aspects, and use ones of the multiple layers below the top layer as they exist in the obtained specialized classifier template; the classifier selection system being further configured to predict how long a class skew of the multiple aspects will last, determine that the specialized classifier can be used to classify the particular subset of the multiple aspects in response to the class skew being predicted to last at least as long as an amount of time that training the specialized classifier to classify the particular subset of the multiple aspects is expected to take, and determine that the specialized classifier is not to be used to classify the particular subset of the multiple aspects in response to the class skew being predicted to last less than the amount of time that training the specialized classifier to classify the particular subset of the multiple aspects is expected to take; the general classifier comprising a first deep neural network, and the specialized classifier comprising a second deep neural network that is shallower than the first deep neural network; the classifier selection system being further configured to determine when usage of the specialized classifier is to cease, and change to using the general classifier, rather than the specialized classifier, to classify the particular subset of the multiple aspects in images of the image stream subsequent to the determination that usage of the specialized classifier is to cease.

A computing device comprising: one or more processors; and a computer-readable storage medium having stored thereon multiple instructions that, responsive to execution by the one or more processors, cause the one or more processors to perform acts comprising: obtaining an image stream; determining when a specialized classifier can be used to classify a particular subset of multiple aspects of content of the image stream, the specialized classifier exploiting class skew of the particular subset of the multiple aspects, the determining including identifying when the particular subset of the multiple aspects dominates the image stream; accessing the specialized classifier to classify the particular subset of the multiple aspects; and using the specialized classifier rather than a general classifier to classify the particular subset of the multiple aspects in subsequent images of the image stream.

Alternatively or in addition to any of the above described computing devices, any one or combination of: the accessing comprising obtaining a specialized classifier template from a store of multiple specialized classifier templates, the obtained specialized classifier template including multiple layers, re-training a top layer of the obtained specialized classifier template using images including the particular subset of the multiple aspects, and using ones of the multiple layers below the top layer as they exist in the obtained specialized classifier template; the determining further comprising accessing a store of multiple specialized classifier templates, selecting, based on the particular subset of the multiple aspects, one of the multiple specialized classifier templates, and using the selected one of the multiple specialized classifier templates as the specialized classifier to classify the particular subset of the multiple aspects; the determining further comprising predicting how long the class skew of the particular subset of the multiple aspects will last, determining that the specialized classifier can be used to classify the particular subset of the multiple aspects in response to the class skew being predicted to last at least as long as an amount of time that accessing the specialized classifier to classify the particular subset of the multiple aspects is expected to take, and determining that the general classifier rather than the specialized classifier is to be used to classify the particular subset of the multiple aspects in response to the class skew being predicted to last less than the amount of time that accessing the specialized classifier to classify the particular subset of the multiple aspects is expected to take; the acts further comprising determining when usage of the specialized classifier is to cease, and changing to using the general classifier, rather than the specialized classifier, to classify the particular subset of the multiple aspects in images of the image stream subsequent to the determination that usage of the specialized classifier is to cease.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving an image stream;
   determining when a specialized classifier can be used to classify a subset of multiple aspects of content of the image stream, the specialized classifier exploiting class skew of the subset of the multiple aspects, the determining including identifying when the subset of the multiple aspects dominates the image stream;
   accessing the specialized classifier to classify the subset of the multiple aspects;
   using the specialized classifier rather than a general classifier to classify the subset of the multiple aspects in subsequent images of the image stream;
   determining when usage of the specialized classifier is to cease; and
   changing to using the general classifier, rather than the specialized classifier, to classify the subset of the multiple aspects in images of the image stream subsequent to the determination that usage of the specialized classifier is to cease.

2. The method as recited in claim 1, further comprising:
   using, for a particular subsequent image of the image stream, the general classifier to classify one or more aspects of content in the particular subsequent image in response to the specialized classifier being unable to classify the one or more aspects of content in the particular subsequent image.

3. The method as recited in claim 1, the accessing the specialized classifier comprising training the specialized classifier.

4. The method as recited in claim 3, the training comprising:
   obtaining a specialized classifier template from a store of multiple specialized classifier templates, the obtained specialized classifier template including multiple layers;
   re-training a top layer of the obtained specialized classifier template using images including the subset of the multiple aspects; and
   using ones of the multiple layers below the top layer as they exist in the obtained specialized classifier template.

5. The method as recited in claim 4, the ones of the multiple layers below the top layer having been trained for use in the specialized classifier template prior to receipt of the image stream.

6. The method as recited in claim 1, the determining further comprising:
   accessing a store of multiple specialized classifier templates;
   selecting, based on the subset of the multiple aspects, one of the multiple specialized classifier templates; and
   using the selected one of the multiple specialized classifier templates as the specialized classifier to classify the subset of the multiple aspects.

7. The method as recited in claim 6, the selecting comprising:
   determining the class skew of the multiple aspects;
   determining a number of aspects in the subset of the multiple aspects; and
   selecting one of the multiple specialized classifier templates based at least in part on the class skew of the multiple aspects and the number of aspects in the subset of the multiple aspects, which of the multiple specialized classifier templates to select for a particular class skew and a particular number of aspects in the subset of the multiple aspects having been pre-determined prior to receipt of the image stream.

8. The method as recited in claim 1, the general classifier comprising a first deep neural network, and the specialized classifier comprising a second deep neural network that is shallower than the first deep neural network.

9. A method comprising:
   receiving an image stream;
   determining when a specialized classifier can be used to classify a subset of multiple aspects of content of the image stream, the specialized classifier exploiting class skew of the subset of the multiple aspects, the determining including identifying when the subset of the multiple aspects dominates the image stream and predicting how long the class skew will last;
   in response to the class skew being predicted to last at least as long as an amount of time that accessing the specialized classifier to classify the subset of the multiple aspects is expected to take:
      determining that the specialized classifier can be used to classify the subset of the multiple aspects,
      accessing the specialized classifier to classify the subset of the multiple aspects, and
      using the specialized classifier rather than a general classifier to classify the subset of the multiple aspects in subsequent images of the image stream; and
   determining that the specialized classifier is not to be used to classify the subset of the multiple aspects in response to the class skew being predicted to last less than the amount of time that accessing the specialized classifier to classify the subset of the multiple aspects is expected to take.

10. The method as recited in claim 9, the determining when the specialized classifier can be used comprising:
   determining the class skew;
   determining a number of aspects in the subset of the multiple aspects;
   selecting, from a store of multiple specialized classifier templates, one of the multiple specialized classifier templates based at least in part on the class skew of the multiple aspects and the number of aspects in the subset of the multiple aspects; and
   using the selected one of the multiple specialized classifier templates as the specialized classifier to classify the subset of the multiple aspects.

11. A classification system comprising:
   a general classifier configured to classify multiple aspects of content of an image stream;
   a template store including multiple different specialized classifier templates, each of the specialized classifier templates being configured to classify a subset of the multiple aspects; and
   a classifier selection system configured to re-train one of the multiple different specialized classifier templates to generate a specialized classifier for a particular subset of the multiple aspects, and to determine when to switch between using the general classifier to classify the multiple aspects of content of the image stream and using the specialized classifier to classify the multiple aspects of content of the image stream.

12. The classification system as recited in claim 11, the classifier selection system being further configured to:
   obtain a specialized classifier template from the template store, the obtained specialized classifier template including multiple layers;
   re-train a top layer of the obtained specialized classifier template using images including the particular subset of the multiple aspects; and
   use ones of the multiple layers below the top layer as they exist in the obtained specialized classifier template.

13. The classification system as recited in claim 11, the classifier selection system being further configured to:
   predict how long a class skew of the multiple aspects will last;
   determine that the specialized classifier can be used to classify the particular subset of the multiple aspects in response to the class skew being predicted to last at least as long as an amount of time that training the specialized classifier to classify the particular subset of the multiple aspects is expected to take; and
   determine that the specialized classifier is not to be used to classify the particular subset of the multiple aspects in response to the class skew being predicted to last less than the amount of time that training the specialized classifier to classify the particular subset of the multiple aspects is expected to take.

14. The classification system as recited in claim 11, the general classifier comprising a first deep neural network, and the specialized classifier comprising a second deep neural network that is shallower than the first deep neural network.

15. The classification system as recited in claim 11, the classifier selection system being further configured to:
   determine when usage of the specialized classifier is to cease; and
   change to using the general classifier, rather than the specialized classifier, to classify the particular subset of the multiple aspects in images of the image stream subsequent to the determination that usage of the specialized classifier is to cease.

16. A computing device comprising:
   one or more processors; and
   a computer-readable storage device having stored thereon multiple instructions that, responsive to execution by the one or more processors, cause the one or more processors to perform acts comprising:
      obtaining an image stream;
      determining when a specialized classifier can be used to classify a particular subset of multiple aspects of content of the image stream, the specialized classifier exploiting class skew of the particular subset of the multiple aspects, the determining including identifying when the particular subset of the multiple aspects dominates the image stream;
      accessing the specialized classifier to classify the particular subset of the multiple aspects; and
      using the specialized classifier rather than a general classifier to classify the particular subset of the multiple aspects in subsequent images of the image stream.

17. The computing device as recited in claim 16, the accessing comprising:
   obtaining a specialized classifier template from a store of multiple specialized classifier templates, the obtained specialized classifier template including multiple layers;
   re-training a top layer of the obtained specialized classifier template using images including the particular subset of the multiple aspects; and
   using ones of the multiple layers below the top layer as they exist in the obtained specialized classifier template.

18. The computing device as recited in claim 16, the determining further comprising:
   accessing a store of multiple specialized classifier templates;
   selecting, based on the particular subset of the multiple aspects, one of the multiple specialized classifier templates; and
   using the selected one of the multiple specialized classifier templates as the specialized classifier to classify the particular subset of the multiple aspects.

19. The computing device as recited in claim 16, the determining further comprising:
   predicting how long the class skew of the particular subset of the multiple aspects will last;
   determining that the specialized classifier can be used to classify the particular subset of the multiple aspects in response to the class skew being predicted to last at least as long as an amount of time that accessing the specialized classifier to classify the particular subset of the multiple aspects is expected to take; and
   determining that the general classifier rather than the specialized classifier is to be used to classify the particular subset of the multiple aspects in response to the class skew being predicted to last less than the amount of time that accessing the specialized classifier to classify the particular subset of the multiple aspects is expected to take.

20. The computing device as recited in claim 16, the acts further comprising:

determining when usage of the specialized classifier is to cease; and changing to using the general classifier, rather than the specialized classifier, to classify the particular subset of the multiple aspects in images of the image stream subsequent to the determination that usage of the specialized classifier is to cease.

\* \* \* \* \*